(12) United States Patent
Lee et al.

(10) Patent No.: US 8,509,428 B2
(45) Date of Patent: Aug. 13, 2013

(54) HIGH-SPEED PIPELINED ARIA ENCRYPTION APPARATUS

(75) Inventors: Sang Woo Lee, Daejeon (KR); Byung Ho Chung, Daejeon (KR); Jeong Nyeo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1054 days.

(21) Appl. No.: 12/509,347

(22) Filed: Jul. 24, 2009

(65) Prior Publication Data
US 2010/0074440 A1    Mar. 25, 2010

(30) Foreign Application Priority Data
Sep. 19, 2008 (KR) .................. 10-2008-0092301

(51) Int. Cl.
*H04L 9/30* (2006.01)

(52) U.S. Cl.
USPC .......... 380/44; 380/28; 380/29; 380/30; 380/36; 380/37; 716/150; 716/168; 716/189

(58) Field of Classification Search
USPC ............. 380/28–30, 36–37, 44; 713/150, 713/168, 189
See application file for complete search history.

(56) References Cited

U.S. PATENT DOCUMENTS

| | | | |
|---|---|---|---|
| 8,094,815 B2 * | 1/2012 | Koo et al. | 380/29 |
| 2005/0283714 A1 * | 12/2005 | Korkishko et al. | 714/781 |
| 2008/0112560 A1 * | 5/2008 | Koo et al. | 380/29 |
| 2008/0285745 A1 * | 11/2008 | Teglia et al. | 380/29 |
| 2009/0222664 A1 * | 9/2009 | Cho et al. | 713/170 |
| 2011/0004746 A1 * | 1/2011 | Lee et al. | 713/1 |

FOREIGN PATENT DOCUMENTS

| | | |
|---|---|---|
| KR | 1020020071328 A | 9/2002 |
| KR | 1020020087331 A | 11/2002 |
| KR | 1020070021883 A | 2/2007 |
| KR | 1020070060882 A | 6/2007 |
| KR | 100786391 B1 | 10/2007 |

OTHER PUBLICATIONS

National Security Research Institute, "Specification of ARIA", Jan. 2005, pp. 1-30.*
Kwon et al., "New Block Cipher: ARIA", 2004.*

\* cited by examiner

*Primary Examiner* — Kambiz Zand
*Assistant Examiner* — Tongoc Tran

(57) ABSTRACT

There is provided a high-speed pipelined ARIA encryption apparatus. The high-speed pipelined ARIA encryption apparatus includes a round key generator for generating a plurality of round keys required for performing an encryption operation using a master key formed to have uniform bits, a plurality of round units whose number is in proportion to the number of times of round operations corresponding to the number of bit of an input value to receive the round keys and the input value and to perform the round operations, and a plurality of pipelined register provided between the round units to transmit the output value of a previous round unit as the input value of the next round unit. A plurality of round units are provided and pipelined registers are inserted between the round units so that it is possible to improve the performance of processing a large amount of data and to perform ARIA encryption at high speed.

15 Claims, 14 Drawing Sheets

FIG. 10

$$\delta_1(\chi) = \begin{bmatrix} 1 & 0 & 1 & 0 & 1 & 1 & 0 & 1 \\ 1 & 1 & 1 & 1 & 1 & 1 & 0 & 1 \\ 1 & 0 & 0 & 1 & 1 & 1 & 0 & 0 \\ 1 & 0 & 1 & 0 & 1 & 0 & 1 & 1 \\ 1 & 1 & 0 & 1 & 1 & 0 & 1 & 1 \\ 0 & 1 & 1 & 1 & 1 & 1 & 1 & 1 \\ 0 & 0 & 0 & 0 & 1 & 0 & 1 & 1 \\ 0 & 1 & 1 & 0 & 1 & 0 & 1 & 1 \end{bmatrix} \begin{bmatrix} \chi_0 \\ \chi_1 \\ \chi_2 \\ \chi_3 \\ \chi_4 \\ \chi_5 \\ \chi_6 \\ \chi_7 \end{bmatrix} \oplus \begin{bmatrix} 1 \\ 1 \\ 0 \\ 0 \\ 0 \\ 1 \\ 1 \\ 0 \end{bmatrix}$$

FIG. 11

$$\delta_1^{-1}(\chi) = \begin{bmatrix} 1 & 1 & 0 & 0 & 1 & 0 & 1 & 0 \\ 1 & 1 & 0 & 1 & 1 & 0 & 1 & 1 \\ 1 & 1 & 0 & 1 & 1 & 0 & 0 & 0 \\ 0 & 0 & 0 & 1 & 1 & 0 & 1 & 1 \\ 1 & 1 & 1 & 0 & 1 & 1 & 1 & 1 \\ 0 & 0 & 0 & 1 & 1 & 1 & 1 & 0 \\ 1 & 0 & 0 & 0 & 1 & 1 & 1 & 0 \\ 0 & 1 & 1 & 0 & 0 & 0 & 1 & 1 \end{bmatrix} \begin{bmatrix} \chi_0 \\ \chi_1 \\ \chi_2 \\ \chi_3 \\ \chi_4 \\ \chi_5 \\ \chi_6 \\ \chi_7 \end{bmatrix} \oplus \begin{bmatrix} 1 \\ 1 \\ 0 \\ 1 \\ 0 \\ 0 \\ 1 \\ 0 \end{bmatrix}$$

FIG. 12

$$\delta_2(\chi) = \begin{bmatrix} 0 & 0 & 1 & 1 & 1 & 0 & 1 & 1 \\ 0 & 0 & 1 & 0 & 0 & 1 & 1 & 0 \\ 1 & 0 & 0 & 1 & 0 & 1 & 0 & 0 \\ 1 & 1 & 0 & 1 & 0 & 0 & 0 & 1 \\ 0 & 1 & 0 & 1 & 1 & 0 & 0 & 1 \\ 1 & 0 & 0 & 0 & 1 & 1 & 0 & 1 \\ 0 & 0 & 0 & 1 & 0 & 1 & 0 & 0 \\ 1 & 1 & 0 & 1 & 0 & 0 & 1 & 1 \end{bmatrix} \begin{bmatrix} \chi_0 \\ \chi_1 \\ \chi_2 \\ \chi_3 \\ \chi_4 \\ \chi_5 \\ \chi_6 \\ \chi_7 \end{bmatrix} \oplus \begin{bmatrix} 0 \\ 1 \\ 0 \\ 0 \\ 0 \\ 1 \\ 1 \\ 1 \end{bmatrix}$$

FIG. 13

$$\delta_2^{-1}(\chi) = \begin{bmatrix} 0 & 0 & 1 & 0 & 0 & 0 & 1 & 0 \\ 0 & 0 & 1 & 0 & 1 & 1 & 0 & 0 \\ 1 & 0 & 1 & 1 & 0 & 1 & 0 & 1 \\ 1 & 1 & 1 & 0 & 0 & 1 & 1 & 0 \\ 0 & 0 & 1 & 1 & 1 & 0 & 1 & 0 \\ 1 & 1 & 1 & 0 & 0 & 1 & 0 & 0 \\ 0 & 0 & 0 & 1 & 0 & 0 & 0 & 1 \\ 1 & 1 & 1 & 1 & 1 & 0 & 0 & 0 \end{bmatrix} \begin{bmatrix} \chi_0 \\ \chi_1 \\ \chi_2 \\ \chi_3 \\ \chi_4 \\ \chi_5 \\ \chi_6 \\ \chi_7 \end{bmatrix} \oplus \begin{bmatrix} 1 \\ 1 \\ 0 \\ 1 \\ 1 \\ 0 \\ 1 \\ 1 \end{bmatrix}$$

HIGH-SPEED PIPELINED ARIA ENCRYPTION APPARATUS

CROSS-REFERENCE TO RELATED APPLICATION

This application claims the benefit of Korean Application No. 10-2008-0092301 filed on Sep. 19, 2008 in the Korean Intellectual Property Office, the disclosure of which is incorporated by reference.

BACKGROUND OF THE INVENTION

1. Field of the Invention

The present invention relates to a high-speed pipelined ARIA encryption apparatus, and more particularly, to a high-speed pipelined ARIA encryption apparatus in which a plurality of round units are provided in accordance with the number of times of rounds so that ARIA encryption can be performed at high speed.

2. Discussion of the Related Art

An ARIA encryption algorithm is a public-private block symmetrical key encryption algorithm developed by the NSRI.

In general, in the ARIA encryption algorithm, with respect to the number of rounds and the size of a master key, it is recommended to use a 12-round operation when the master key has 128 bits, to use a 14-round operation when the master key has 192 bits, and to use a 16-round operation when the master key has 256 bits.

The ARIA algorithm performs an encryption operation by round operations that include a substitution operation and a diffusion operation.

In the ARIA algorithm, key extension processes include key initialization processes and round key generation processes of generating four 128-bit initialization key values W0, W1, W2, and W3 when the master key MK and specific initialization constants (CK1, CK2, and CK3) are given as inputs.

In accordance with a method of performing the substitution and diffusion operations and a method of performing the key extension processes, there is a difference in the time spent on the ARIA encryption operation and used hardware resources, which is directly connected to the performance of an ARIA encryption processor.

The conventional ARIA encryption apparatus repeatedly drives one round unit so that a plurality of clock cycles are used for encrypting a large amount of data when the encryption operation is performed.

SUMMARY OF THE INVENTION

It is an object of the present invention to provide a high-speed pipelined ARIA encryption apparatus in which a plurality of round units are provided so that ARIA encryption can be performed at high speed.

Therefore, in order to achieve the above object, there is provided a high-speed pipelined ARIA encryption apparatus, including a round key generator for generating a plurality of round keys required for performing an encryption operation using a master key formed to have uniform bits, a plurality of round units whose number is in proportion to the number of times of round operations corresponding to the number of bit of an input value to receive the round keys and the input value and to perform the round operations, and a plurality of pipelined register provided between the round units to transmit the output value of a previous round unit as the input value of the next round unit.

According to the ARIA encryption apparatus, a plurality of round units are provided, pipelined registers are inserted between the round units, and sub-pipelined registers are inserted into the round units. Therefore, a block encryption operation without a feedback is calculated in one clock to perform a high performance encryption operation. Therefore, since it is possible to improve the performance of processing a large amount of data, it is possible to perform ARIA encryption at high speed. In addition, key initialization processes are performed using the round units without including an additional key initialization operation unit. Therefore, it is possible to reduce the size of hardware. In addition, a substitution unit is not formed of a look-up table but is formed of a composite field logic and the sub-pipelined registers are inserted. Therefore, it is possible to improve the performance of processing a large amount of data.

The present invention can be applied to an ARIA encryption algorithm. A plurality of round units are provided in accordance with the number of times of rounds so that ARIA encryption can be performed at high speed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 10 to 13 are matrices illustrating the operations performed by first to fourth unification units;

DETAILED DESCRIPTION OF THE PREFERRED EMBODIMENTS

Hereinafter, the present invention will be described in detail with reference to the accompanying drawings.

An ARIA encryption apparatus includes a plurality of round units that perform round operations to correspond to the number of rounds set in accordance with the size of a master key to perform an encryption operation at high speed.

In the present ARIA encryption apparatus, 12 round units for performing the round operations are provided when the master key has 128 bits, 14 round units are provided when the master key has 192 bits, and 16 round units are provided when the master key has 256 bits. In the following embodiment, the case in which the master key has 128 bits will be taken as an example. However, the structure of the present invention can be applied when the master key has 192 bits and 256 bits.

Figure 1:
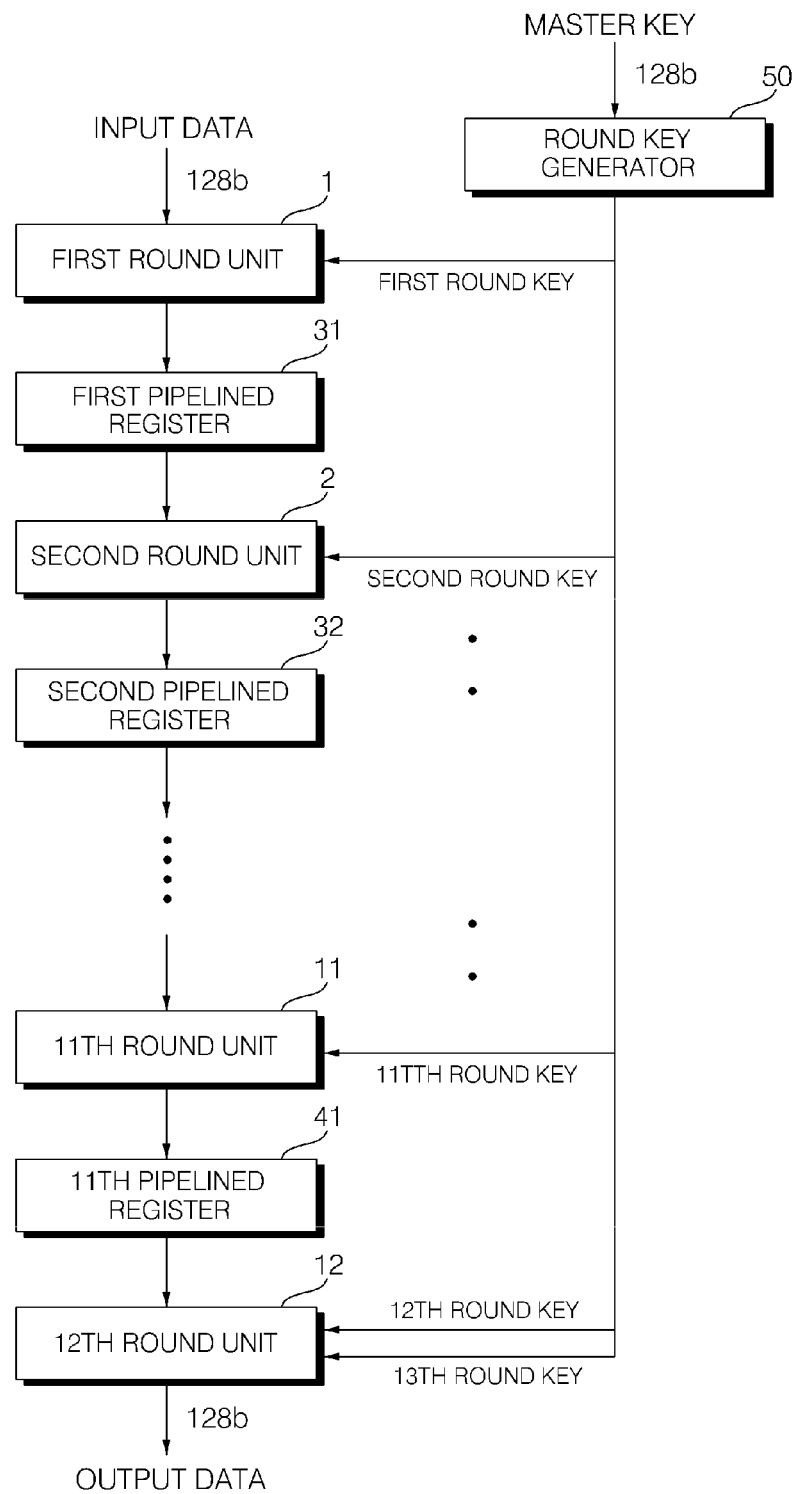
FIG. 1 is a block diagram of an ARIA encryption apparatus for encrypting a master key of 128 bits according to an embodiment of the present invention.

FIG. 1 is a block diagram of an ARIA encryption apparatus for encrypting a master key of 128 bits according to an embodiment of the present invention.

The ARIA encryption apparatus includes a round key generator 50, first to 12th round units 1, 2, •; 11, and 12, and first to 11th pipelined registers 31, 32, •; 41.

The round key generator 50 generates round keys required for performing the encryption operation using the master keys of 128 bits, 192 bits, and 256 bits. The round key generator 50 generates first to 13th round keys when the master key has 128 bit, generates first to 15th round keys when the master key has 192 bits, and generates first to 17th round keys when the master key has 256 bits. Since the ARIA encryption apparatus according to the present embodiment encrypts the master key of 128 bits, the round key generator 50 generates the first to 13th round keys.

The first to 12th round units 1, 2, •; 11, and 12 perform the round operations for the input value of 128 bits to perform encryption. When the round operations are performed for the input value of 192 bits, the 13th round unit and the 14th round unit must be further provided. When the round operations are performed for the input value of 256 bits, the 15th round unit and the 16th round unit must be further provided.

Here, the first to 12th round units 1, 2, •; 11, and 12 commonly include a first XOR unit and a substitution unit and selectively include a multiplexer, a diffusion unit, and a second XOR unit in accordance with the operation order of the first to 12th round units 1, 2, •; 11, and 12. Detailed description of the structures of the first to 12th round units 1, 2, •; 11, and 12 will be performed later. On the other hand, the first to 12th round units 1, 2, •; 11, and 12 include sub-pipelined registers, which will be described later with reference to the drawings.

The first to 11th pipelined registers 31, 32, •; and 41 store the results output from the first to 12th round units 1, 2, •; 11, and 12 and input the results to the next round units. For example, the first pipelined register 31 inputs the result output from the first round unit 1 to the second round unit 2 and the 11th pipelined register 41 inputs the result output from the 11th round unit 11 to the 12th round unit 12. When the input value of 192 bits is processed, the 12th and 13th pipelined registers must be further provided. When the input value of 256 bits is processed, the 14th and 15th pipelined registers must be further provided.

When the encryption operation is performed using the ARIA encryption apparatus having such a structure, the input value becomes a plaintext and the output value becomes a ciphertext. When a decoding operation is performed using the ARIA encryption apparatus having such a structure, the input value becomes the cihertext and the output value becomes the plaintext.

Figure 2:
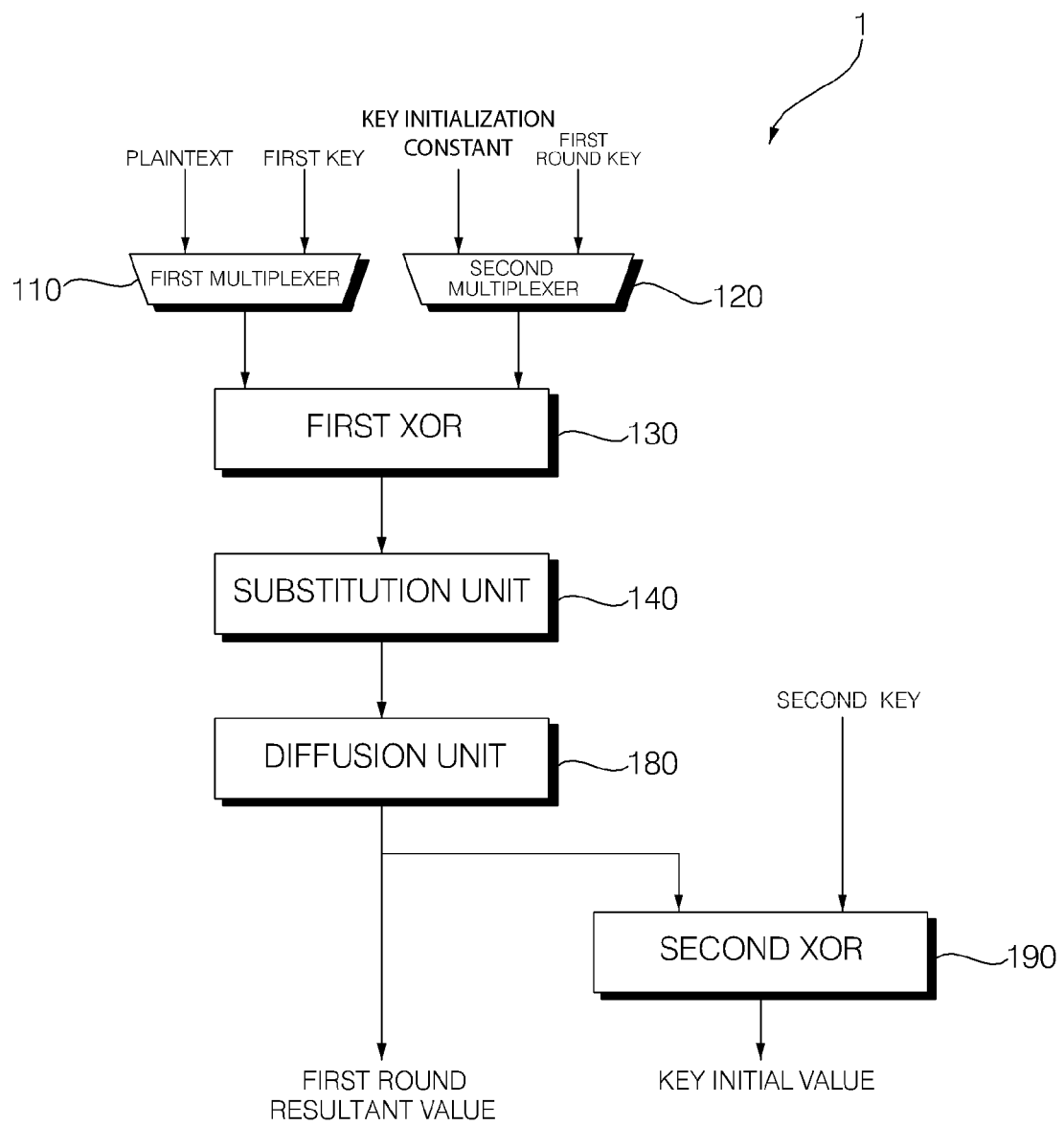
FIG. 2 is a block diagram of the first round unit of FIG. 1.

FIG. 2 is a block diagram of the first round unit of FIG. 1.

The first round unit 1 includes a first multiplexer 110, a second multiplexer 120, a first XOR unit 130, a substitution unit 140, a diffusion unit 180, and a second XOR unit 190.

The first multiplexer 110 receives an input value and a first key to transmit the input value and the first key to the first XOR unit 130. The second multiplexer 120 receives a key initialization constant and a first round key from the round key generator 50 to transmit the key initialization constant and the first round key to the first XOR unit 130. On the other hand, in a common ARIA encryption apparatus, the master key is divided into the first key and a second key. In the ARIA encryption apparatus according to the present invention, the first key is input to the first multiplexer 110 of the first round unit 1 and the second key is input to the second XOR unit 190.

The first XOR unit 130 performs an XOR operation on the plaintext and the first key input through the first multiplexer 110 and the key initialization constant and the first round key input through the second multiplexer 120 in units of bits.

The substitution unit 140 performs the substitution operation for the output value of the first XOR unit 130. The value output from the diffusion unit 180 becomes the first round resultant value that is the output value of the first round unit 1.

The second XOR unit 190 performs an XOR operation on the value output from the diffusion unit 180 and the second key to output a key initial value.

In the first round unit 1, the first and second multiplexers 110 and 120 and the second XOR unit 190 are required for performing the round operations for the plaintext and key initialization processes.

Figure 3:
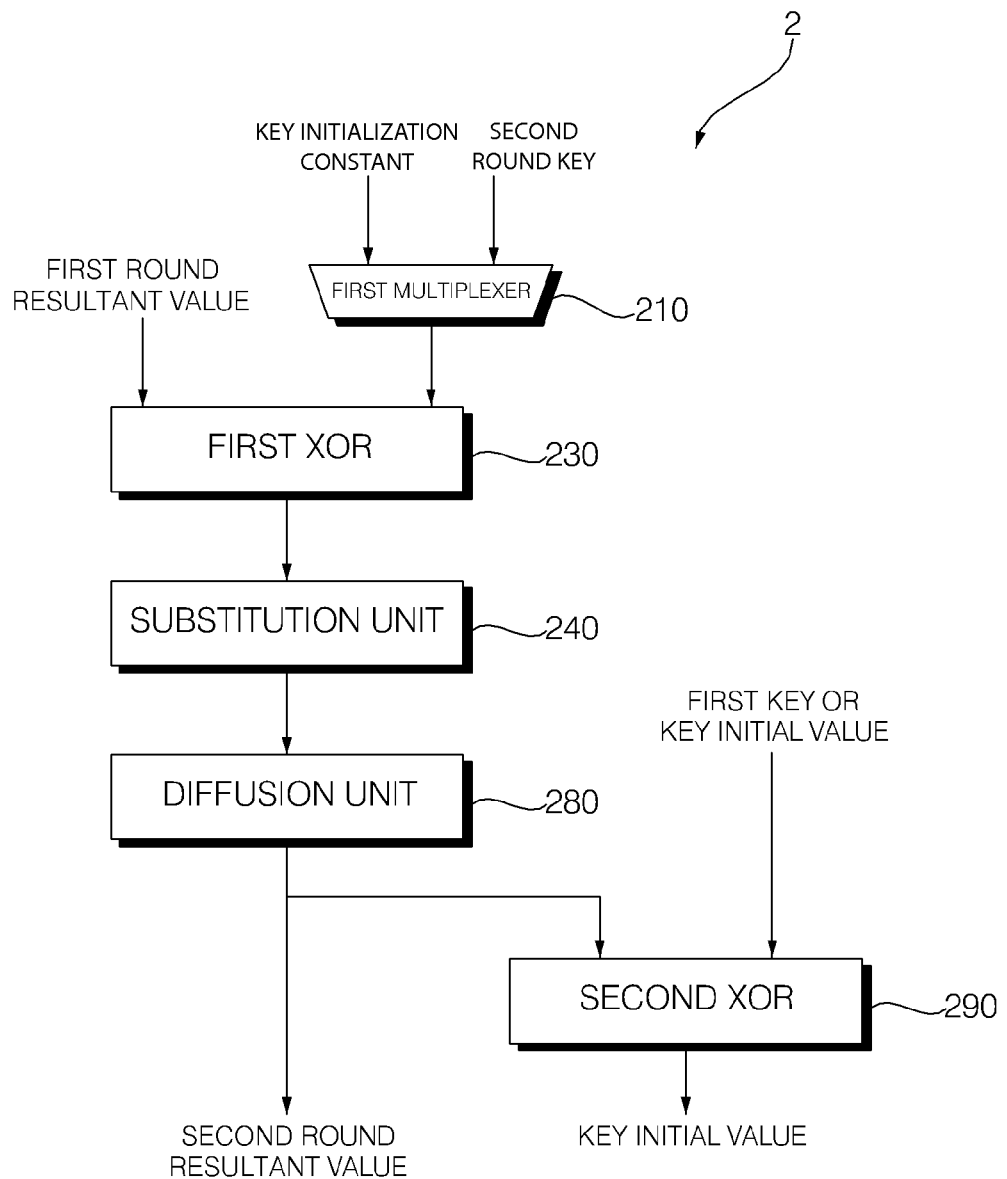
FIG. 3 is a block diagram of the second round unit of FIG. 1.

FIG. 3 is a block diagram of the second round unit of FIG. 1.

The second round unit 2 receives the first round resultant value of the first round unit 1 to perform the round operations and includes a first multiplexer 210, a first XOR unit 230, a substitution unit 2440, a diffusion unit 280, and a second XOR unit 290.

The first multiplexer 210 receives a key initialization constant and a second round key to provide the key initialization constant and the second round key to the first XOR unit 230.

The first XOR unit 230 performs an XOR operation on the first round resultant value of the first round unit 1 and the key initialization constant and the first round key provided from the first multiplexer 210 in units of bits.

The substitution unit 240 performs the substitution operation on the output value of the first XOR unit 230. The diffusion unit 280 performs the diffusion operation on the output value of the substitution unit 240. Here, the output value of the diffusion unit 280 becomes the second round resultant value of the second round unit 2.

The second XOR unit 290 receives the output value of the diffusion unit 280, a first key, or the key initial value output from the first round unit 1 to output the key initial value.

On the other hand, a third round unit (not shown) has the same structure as the second round unit 2 and is different from the second round unit 2 in that the second round resultant value, the key initialization constant from the first multiplexer 210, and a third round key are input to the first XOR unit 230.

In the second round unit 2 and the third round unit, the first multiplexer 210 and the second XOR unit 290 are required for performing the round operations for the plaintext and the key initialization processes using the second round unit 2 and the third round unit. Therefore, the first multiplexer 210 and the second XOR unit 290 are not provided in the fourth to 11th round units 11 that are the next round units.

Figure 4:
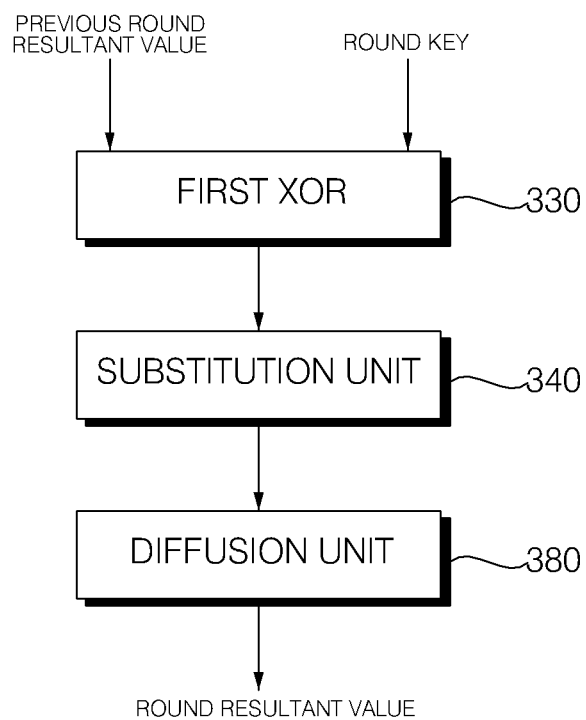
FIG. 4 is a block diagram of the fourth to 11th round units of FIG. 1.

FIG. 4 is a block diagram of the fourth to 11th round units of FIG. 1.

The fourth to 11th round units 11 include an XOR unit 330, a substitution unit 340, and a diffusion unit 380.

The XOR unit 330 receives the previous round resultant value output from the previous round unit and the round key of the corresponding round from the round key generator 50 to perform an XOR operation. For example, the XOR unit 330 of the fourth round unit receives a third round resultant value and a fourth round key from the round key generator 50 to perform an XOR operation and the XOR unit 330 of a fifth round unit (not shown) receives a fourth round resultant value and a fifth round key from the round key generator 50 to perform an XOR operation. The 11th round unit 11 receives a 10th round resultant value and an 11th round key to perform an XOR operation.

The substitution unit 340 performs the substitution operation on the resultant value of the XOR unit 330. The diffusion unit 380 performs the diffusion operation on the resultant value of the substitution unit 340. The resultant value of the diffusion unit 380 becomes the resultant value of each of the round units.

According to the present embodiment, since the case in which the master key has 128 bits is taken as an example, the structures of the fourth to 11th round units 11 are the same. On the other hand, when the master key has 192 bits, the structures of the fourth to 13th round units excluding the last 14th round unit are the same. When the master key has 256 bits, the structures of the fourth to 15th round units excluding the last 16th round unit are the same.

Figure 5:
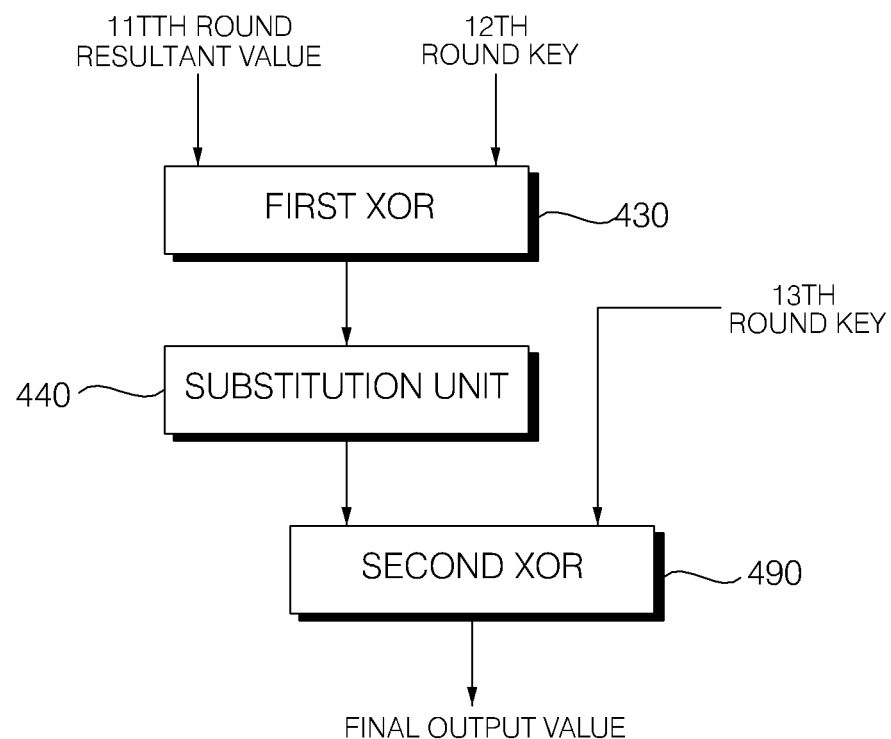
FIG. 5 is a block diagram of the 12th round unit of FIG. 1.

FIG. 5 is a block diagram of the 12th round unit of FIG. 1.

When the master key has 128 bits, since the 12th round unit 12 becomes the last round unit, the structure of FIG. 5 represents the structure of the last round unit. Therefore, when the master key has 192 bits, the structure of the 14th round unit is the same as the structure of FIG. 5. When the master key has 256 bits, the structure of the 16th round unit is the same as the structure of FIG. 5.

The 12th round unit 12 includes a first XOR unit 430, a substitution unit 440, and a second XOR unit 490.

The resultant value of the 11th round that is the previous round and the 12th round key generated by the round key generator 50 are input to the first XOR unit 430. The first XOR unit 430 performs an XOR operation on the 11th round resultant value and the 12th round key.

The substitution unit 440 performs the substitution operation on the resultant value of the first XOR unit 430 and provides the resultant value to the second XOR unit 490.

The second XOR unit 490 receives the resultant value from the substitution unit 440 and the 13th round key from the round key generator 50 to perform an XOR operation and to output a final output value.

When the master key has 192 bits, the 13th round resultant value and the 14th round key are input to the first XOR unit of the 14th round unit to perform an XOR operation. The resultant value of the substitution unit and the 15th round key are input to the second XOR unit to perform an XOR operation and to output the final output value. When the master key has 256 bits, the 15th round resultant value and the 16th round key are input to the first XOR unit of the 16th round unit to perform an XOR operation. The resultant value of the substitution unit and the 17th round key are input to the second XOR unit to perform an XOR operation and to output the final output value.

Figure 6:
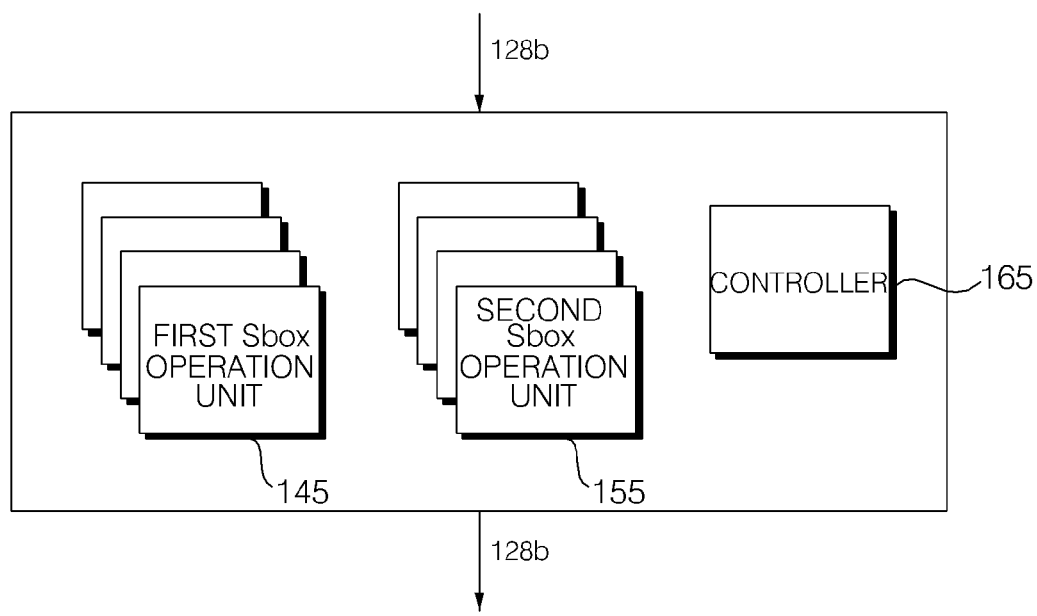
FIG. 6 is a block diagram of the substitution unit illustrated in FIGS. 2 to 5.

FIG. 6 is a block diagram of the substitution unit illustrated in FIGS. 2 to 5.

In FIG. 6, an example of substitution units 140, 240, 340, and 440 that perform the substitution operation on the output value of 128 bits for the input value of 128 bits is illustrated. The substitution units 140, 240, 340, and 440 include a first Sbox operation unit 145, a second Sbox operation unit 155, and a controller 165.

The first Sbox operation unit 145 performs substitution box $S_1$ and inverse substitution box $S_1^{-1}$ operations and the second Sbox operation unit 155 performs substitution box $S_2$ and inverse substitution box $S_2^{-1}$ operations.

The controller 165 controls the operations of the first Sbox operation unit 145 and the second Sbox operation unit 155.

The substitution unit 240 can perform the substitution operation of block encryption ARIA without including additional ROM and/or RAM in order to realize the substitution box. The structures of the first Sbox operation unit 145 and the second Sbox operation unit 155 for performing the substitution operation are as follows.

Figure 7:
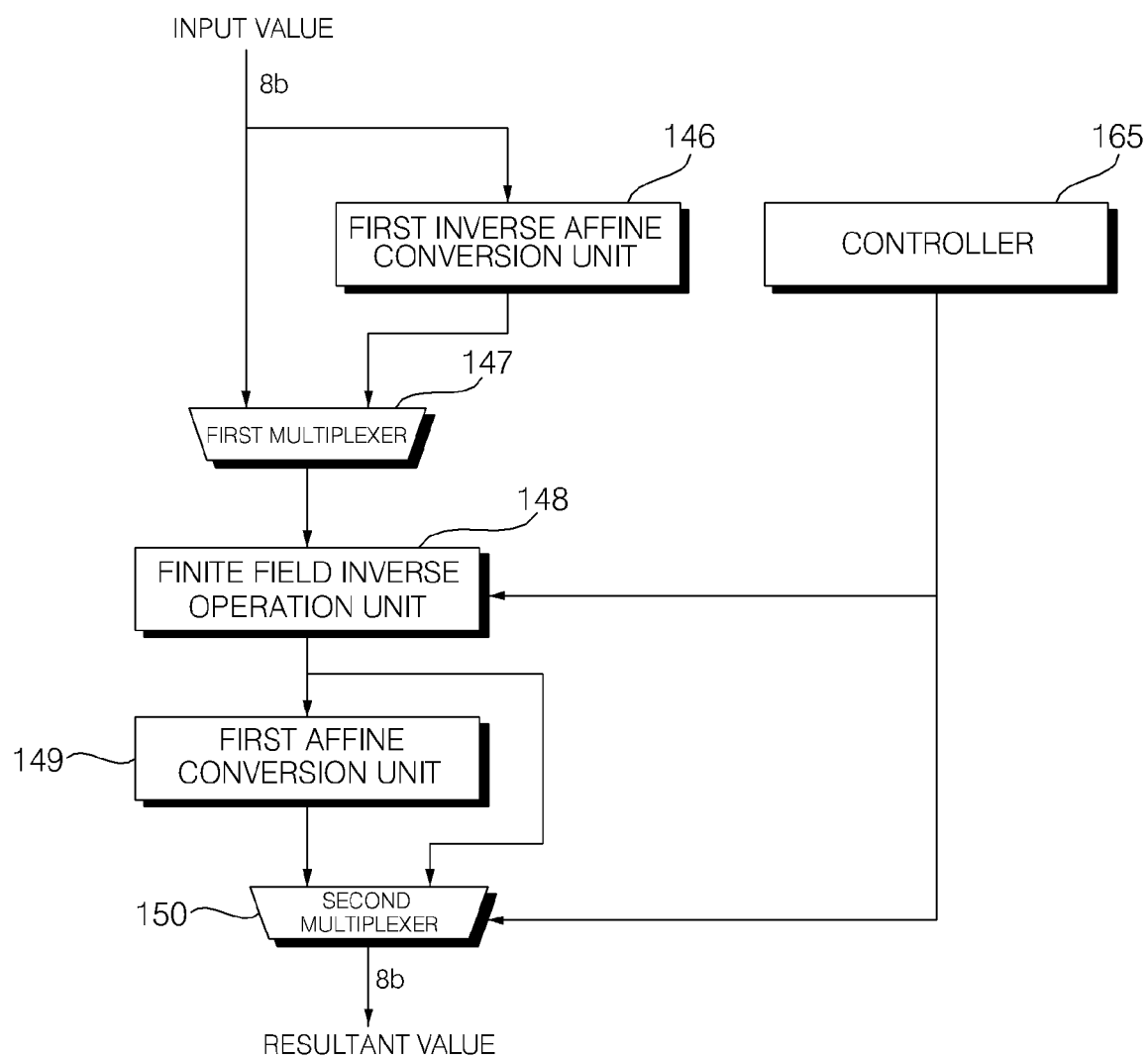
FIG. 7 is a block diagram of the first Sbox operation unit of FIG. 6.

FIG. 7 is a block diagram of the first Sbox operation unit of FIG. 6.

The first Sbox operation unit 145 includes a first inverse affine conversion unit 146, a first multiplexer 147, a finite field inverse operation unit 148, a first affine conversion unit 149, and a second multiplexer 150. The controller 165 generates the selection control signals of the first multiplexer 147 and the second multiplexer 150. The first inverse affine conversion unit 146 obtains the inverse substitution box $S_1^{-1}$ of the input value. The detailed operations of the first inverse affine conversion unit 146 are represented in EQUATION 1.

$$B[0]=A[2] \text{ xor } A[5] \text{ xor } A[7] \text{ xor } `1`$$

$$B[1]=A[0] \text{ xor } A[3] \text{ xor } A[6]$$

$$B[2]=A[1] \text{ xor } A[4] \text{ xor } A[7] \text{ xor } `1`$$

$$B[3]=A[0] \text{ xor } A[2] \text{ xor } A[5]$$

$$B[4]=A[1] \text{ xor } A[3] \text{ xor } A[6]$$

$$B[5]=A[2] \text{ xor } A[4] \text{ xor } A[7]$$

$$B[6]=A[0] \text{ xor } A[3] \text{ xor } A[5]$$

$$B[7]=A[4] \text{ xor } A[4] \text{ xor } A[6] \quad [\text{EQUATION 1}]$$

wherein, A means the input value of 8 bits and consists of A[0] to A[7]. Here, A[0] means the lowermost bit and A[7] means the uppermost bit. B means the output value of 8 bits and consists of B[0] to B[7]. Here, B[0] means the lowermost bit and B[7] means the uppermost bit.

The first multiplexer 147 receives an input value and the resultant value of the first inverse affine conversion unit 146 to determine the input value of the finite field inverse operation unit 148 and to provide the determined input value.

The finite field inverse operation unit 148 calculates $GF(2^8)$ inverse for the input value and/or the resultant value of the first inverse affine conversion unit 146 and performs finite field inverse operation logic for $m(x)=x^8+x^4+x^3+x+1$ that is the irreducible polynomial adopted by the block encryption ARIA algorithm. The resultant value of the finite field inverse operation unit 148 is input to the first affine conversion unit 149 and the second multiplexer 150.

The first affine conversion unit 149 obtains the substitution box $S_1$ of the resultant value of the finite field inverse operation unit 148 and provides the resultant value to the second multiplexer 150. The detailed operations of the first affine conversion unit for obtaining the substitution box $S_1$ are represented in EQUATION 2.

$$B[0]=A[0] \text{ xor } A[4] \text{ xor } A[5] \text{ xor } A[6] \text{ xor } A[7] \text{ xor } `1`$$

$$B[1]=A[1] \text{ xor } A[5] \text{ xor } A[6] \text{ xor } A[7] \text{ xor } A[0] \text{ xor } `1`$$

$$B[2]=A[2] \text{ xor } A[6] \text{ xor } A[7] \text{ xor } A[0] \text{ xor } A[1]$$

B[3]=A[3] xor A[7] xor A[0] xor A[1] xor A[2]

B[4]=A[4] xor A[0] xor A[1] xor A[2] xor A[3]

B[5]=A[5] xor A[1] xor A[2] xor A[3] xor A[4] xor '1'

B[6]=A[6] xor A[2] xor A[3] xor A[4] xor A[5] xor '1'

B[7]=A[7] xor A[3] xor A[4] xor A[5] xor A[6]    [EQUATION 2]

The second multiplexer 150 receives the resultant value of the first affine conversion unit 149 and the resultant value of the finite field inverse operation unit 148 to select one of the resultant value of the first affine conversion unit 149 and the resultant value of the finite field inverse operation unit 148 as the resultant value of the first Sbox operation unit 145 and to output the resultant value.

Figure 8:
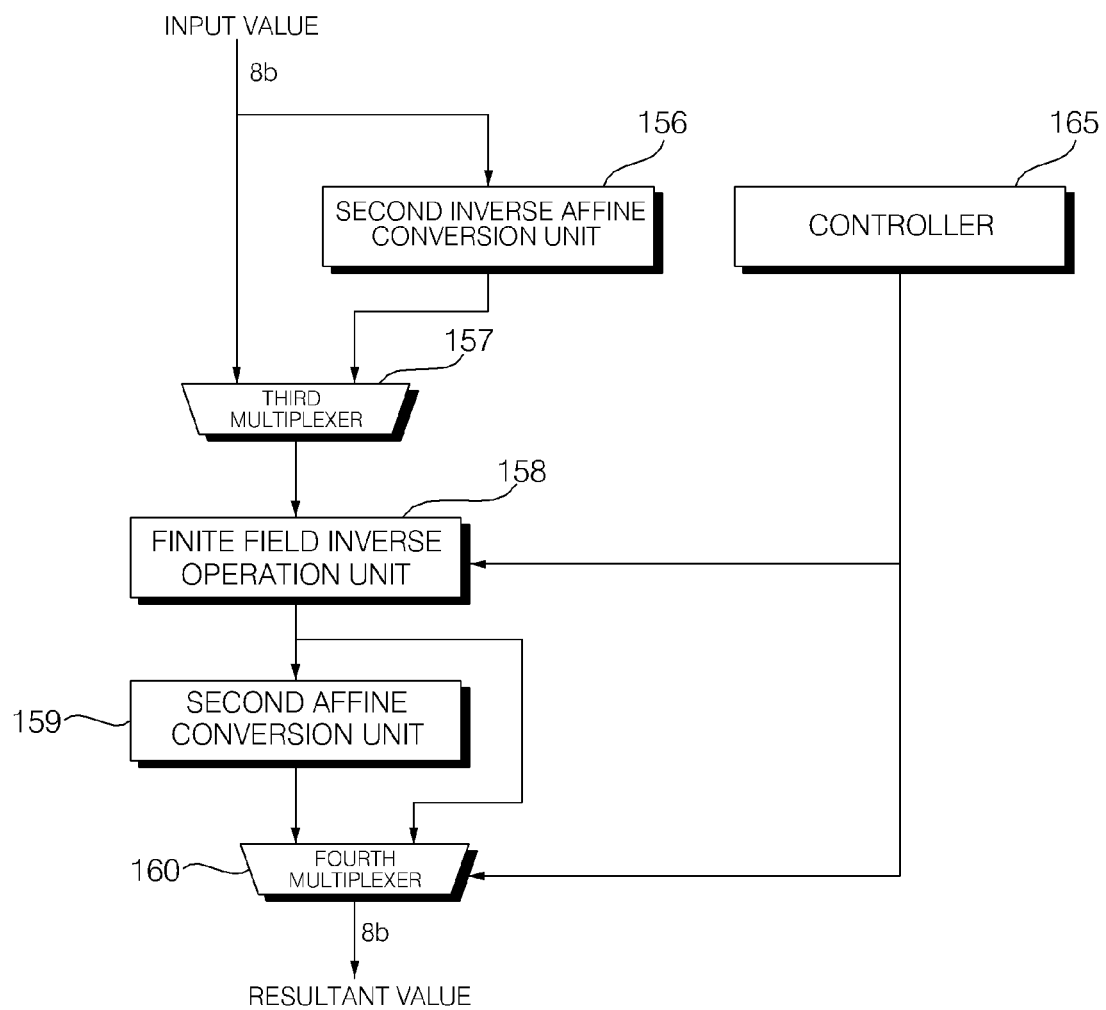
FIG. 8 is a block diagram of the second Sbox operation unit of FIG. 6.

FIG. 8 is a block diagram of the second Sbox operation unit of FIG. 6.

The second Sbox operation unit 155 includes a second inverse affine conversion unit 156, a third multiplexer 157, a finite field inverse operation unit 158, a second affine conversion unit 159, and a fourth multiplexer 160. The controller 165 generates the selective control signal of the third multiplexer 157 and the fourth multiplexer 160.

The second inverse affine conversion unit 156 obtains the inverse substitution box $S_2^{-1}$ of the input value. The detailed operations of the first inverse affine conversion unit 146 are represented in EQUATION 3.

B[0]=A[3] xor A[4]

B[1]=A[2] xor A[5] xor A[6]

B[2]=A[4] xor A[6] xor A[7] xor '1

B[3]=A[0] xor A[1] xor A[2] xor A[6] xor A[7] xor '1'

B[4]=A[0] xor A[1] xor A[2] xor A[4] xor A[5]

B[5]=A[1] xor A[2] xor A[4] xor A[6] xor A[7] xor '1'

B[6]=A[0] xor A[2] xor A[3] xor A[4] xor A[5] xor A[7]

B[7]=A[0] xor A[3] xor A[6] xor A[7]    [EQUATION 3]

The third multiplexer 157 receives the input value and the resultant value of the second inverse affine conversion unit 156 to determine the input value of the finite field inverse operation unit 158 and to provide the determined input value.

The finite field inverse operation unit 158 calculates $GF(2^8)$ inverse for the input value and/or the resultant value of the first inverse affine conversion unit 146 and performs finite field inverse operation logic for $m(x)=x^8+x^4+x^3+x+1$ that is the irreducible polynomial adopted by the block encryption ARIA algorithm. The resultant value of the finite field inverse operation unit 158 is input to the second affine conversion unit 159 and the fourth multiplexer 160.

The second affine conversion unit 159 obtains the substitution box $S_1$ of the resultant value of the finite field inverse operation unit 158 and provides the resultant value to the fourth multiplexer 160. The detailed operations of the second affine conversion unit 159 for obtaining the substitution box $S_1$ are represented in EQUATION 4.

B[0]=A[1] xor A[3] xor A[5] xor A[6] xor A[7]

B[1]=A[2] xor A[3] xor A[4] xor A[5] xor A[6] xor A[7] xor '1'

B[2]=A[0] xor A[1] xor A[2] xor A[4] xor A[5] xor A[7]

B[3]=A[0] xor A[1] xor A[6] xor A[7]

B[4]=A[1] xor A[6] xor A[7]

B[5]=A[0] xor A[1] xor A[4] xor A[5] xor A[6] xor '1'

B[6]=A[1] xor A[2] xor A[6] xor A[7] xor '1'

B[7]=A[0] xor A[1] xor A[2] xor A[3] xor A[5] xor A[6] xor '1'    [EQUATION 4]

The fourth multiplexer 160 receives the resultant value of the second affine conversion unit 159 and the resultant value of the finite field inverse operation unit 158 to select one of the resultant value of the second affine conversion unit 159 and the resultant value of the finite field inverse operation unit 158 as the resultant value of the second Sbox operation unit 155 and to output the resultant value.

Figure 9:
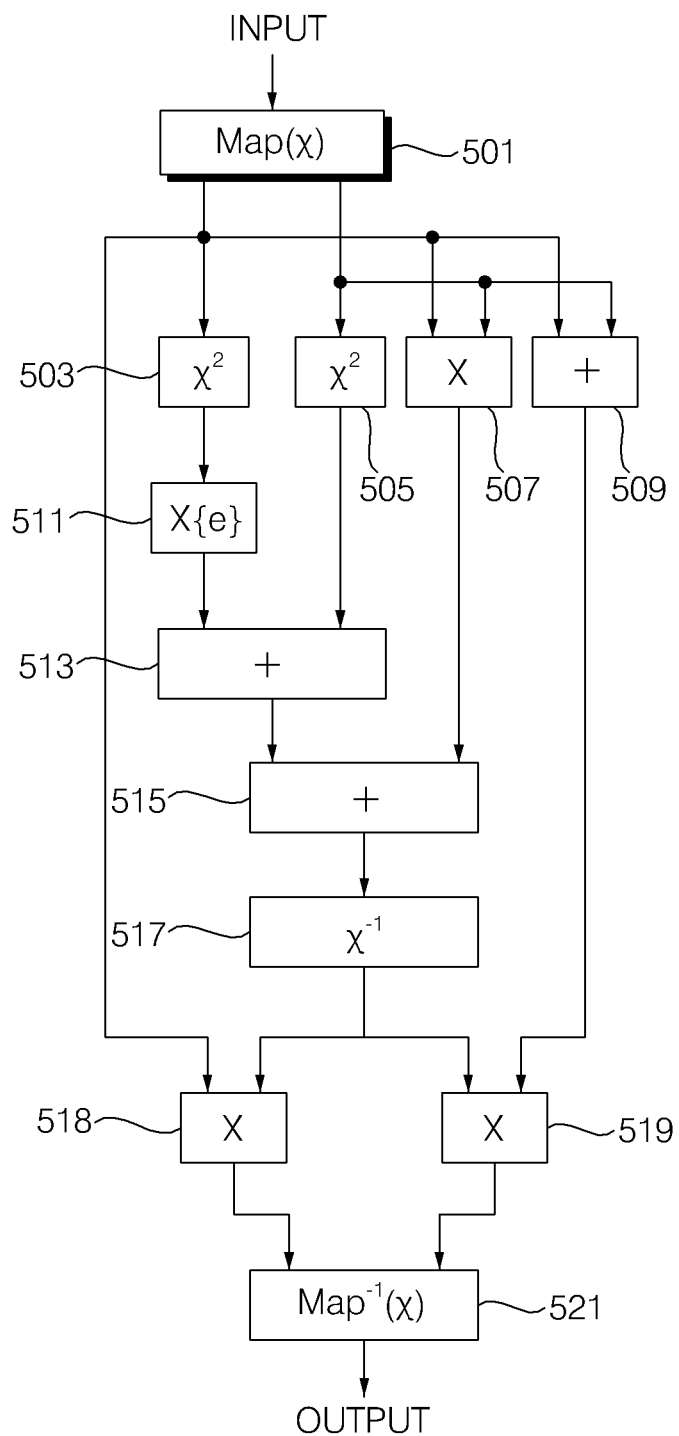
FIG. 9 is a block diagram of the finite field inverse operation unit illustrated in FIGS. 7 and 8.

FIG. 9 is a block diagram of the finite field inverse operation unit illustrated in FIGS. 7 and 8.

The finite field inverse operation units 148 and 158 include a Map(x) function unit 501, first and second squarers 503 and 505, a first multiplier 507, a first adder 509, a constant multiplier 511, a second adder 513, a third adder 515, an inverse unit 517, a second multiplier 518, a third multiplier 519, and a $Map^{-1}(x)$ function unit 521.

The Map(x) function unit 501 operates the input value using a $GF(2^4)$ isomorphic mapping function and uses the following EQUATION 5.

$$M = \begin{bmatrix} 1 & 0 & 0 & 0 & 1 & 1 & 1 & 0 \\ 0 & 1 & 1 & 0 & 0 & 0 & 0 & 0 \\ 0 & 1 & 0 & 0 & 0 & 0 & 0 & 1 \\ 0 & 0 & 1 & 0 & 1 & 0 & 0 & 0 \\ 0 & 0 & 0 & 0 & 1 & 1 & 1 & 0 \\ 0 & 1 & 0 & 0 & 1 & 0 & 1 & 1 \\ 0 & 0 & 1 & 1 & 0 & 1 & 0 & 1 \\ 0 & 0 & 0 & 0 & 0 & 1 & 0 & 1 \end{bmatrix}$$    [EQUATION 5]

The first and second squarers 503 and 505 perform the square operation in $GF(2^4)$, that is, squares the output value of the Map(x) function unit 501.

The first multiplier 507 receives the output value of the Map(x) function unit 501 to perform a multiplication operation in $GF(2^4)$.

The first adder 509 receives the output value of the Map(x) function unit 501 to perform an addition operation in $GF(2^4)$. At this time, the addition operation is an XOR operation.

The constant multiplier 511 receives the output value of the first squarer 503 to perform a multiplication operation on the constant {e} in $GF(2^4)$.

The second adder 513 receives the output value of the constant multiplier 511 and the output value from the second squarer 505 to perform an XOR operation.

The third adder 515 receives the output value of the second adder 513 and the output value of the first multiplier 507 to perform an XOR operation.

The inverse unit 517 receives the output value from the third adder 515 to perform an inverse operation in $GF(2^4)$.

The second multiplier 518 receives the resultant value of the Map(x) function unit 501 and the resultant value from the inverse unit 517 to perform a multiplication operation. The third multiplier 519 receives the resultant value of the first adder 509 and the resultant value of the inverse unit 517 to perform a multiplication operation.

The resultant values of the second multiplier 518 and the third multiplier 519 are input to the Map$^{-1}$(x) function unit 521 to be operated by the GF($2^4$)$^2$ isomorphic mapping function. The Map$^{-1}$(x) function unit 521 performs an operation using the matrix of EQUATION 6.

$$M^{-1} = \begin{bmatrix} 1 & 0 & 0 & 0 & 1 & 0 & 0 & 0 \\ 0 & 0 & 0 & 0 & 1 & 1 & 0 & 1 \\ 0 & 1 & 0 & 0 & 1 & 1 & 0 & 1 \\ 0 & 1 & 0 & 0 & 1 & 1 & 1 & 0 \\ 0 & 1 & 0 & 1 & 1 & 1 & 0 & 1 \\ 0 & 0 & 1 & 0 & 1 & 1 & 0 & 0 \\ 0 & 1 & 1 & 1 & 1 & 0 & 0 & 1 \\ 0 & 0 & 1 & 0 & 1 & 1 & 0 & 1 \end{bmatrix}$$ [EQUATION 6]

On the other hand, in the elements of the finite field inverse operation units 148 and 158, the Map$^{-1}$(x) function unit 521 can be united with the first and second affine conversion units 149 and 159 and the Map(x) function unit 501 can be united with the first Sbox operation unit 145 and the second Sbox operation unit 155. Therefore, the Map$^{-1}$(x) function unit 521 and the first affine conversion unit 149 are united to form a first unification unit, the Map(x) function unit 501 and the first inverse affine conversion unit 146 are united to form a second unification unit, the Map$^{-1}$(x) function unit 521 and the second affine conversion unit 159 are united to form a third unification unit, and the Map(x) function unit 501 and the second inverse affine conversion unit 156 are united to form a fourth unification unit.

The operations performed by the first to fourth unification units can be illustrated in FIGS. 10 to 13.

Figure 14:
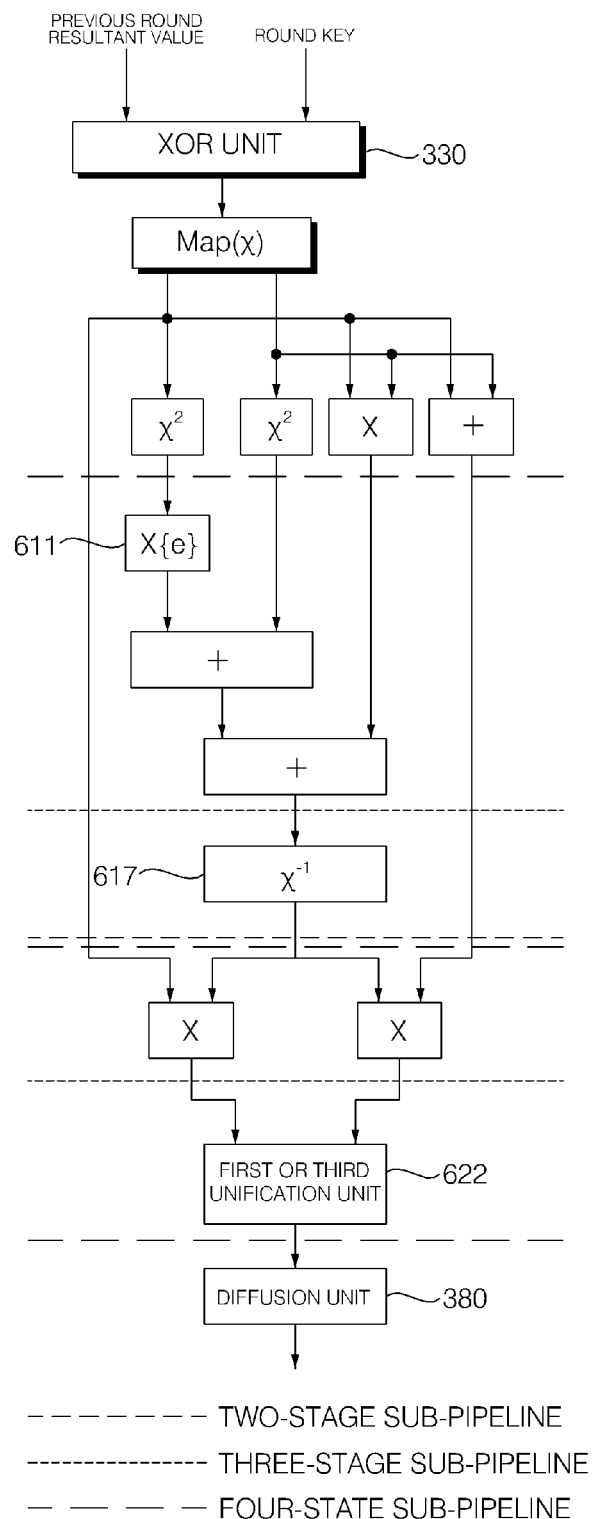
FIG. 14 is a block diagram illustrating that sub-pipelined registers are displayed on the round units that operate substitution boxes $S_1$ and $S_2$ among the fourth to 11th round units of FIG. 1.

FIG. 14 is a block diagram illustrating that sub-pipelined registers are displayed on the round units that operate substitution boxes S$_1$ and S$_2$ among the fourth to 11th round units of FIG. 1.

In the round unit of FIG. 14, the positions of the sub-pipelined registers are illustrated so that the positions of the sub-pipelined registers are divided into two stages, three stages, and four stages.

In the case of the two-stage sub-pipelined register, the sub-pipelined register is provided after the inverse unit 617 of GF($2^4$).

In the case of the three-stage sub-pipelined register, the first sub-pipelined register is provided before the inverse unit 617 of GF($2^4$) and the second sub-pipelined register is provided before the first unification unit or the third unification unit 622. Here, the first unification unit or the third unification unit 622 is displayed as the first unification unit when the Map$^{-1}$(x) function unit and the first affine conversion unit 149 are united and is displayed as the third unification unit when the Map$^{-1}$(x) function unit and the second affine conversion unit 159 are united.

In the case of the four-stage sub-pipelined register, the first sub-pipelined register is provided before the constant multiplier 611 that performs the multiplication operation for the constant {e} in GF($2^4$), the second sub-pipelined register is provided after the inverse unit 617 of GF($2^4$), and the third sub-pipelined register is provided before the diffusion unit 280.

The sub-pipelined registers are provided so that delay times are the same and that the performance of the operation logic is improved.

Figure 15:
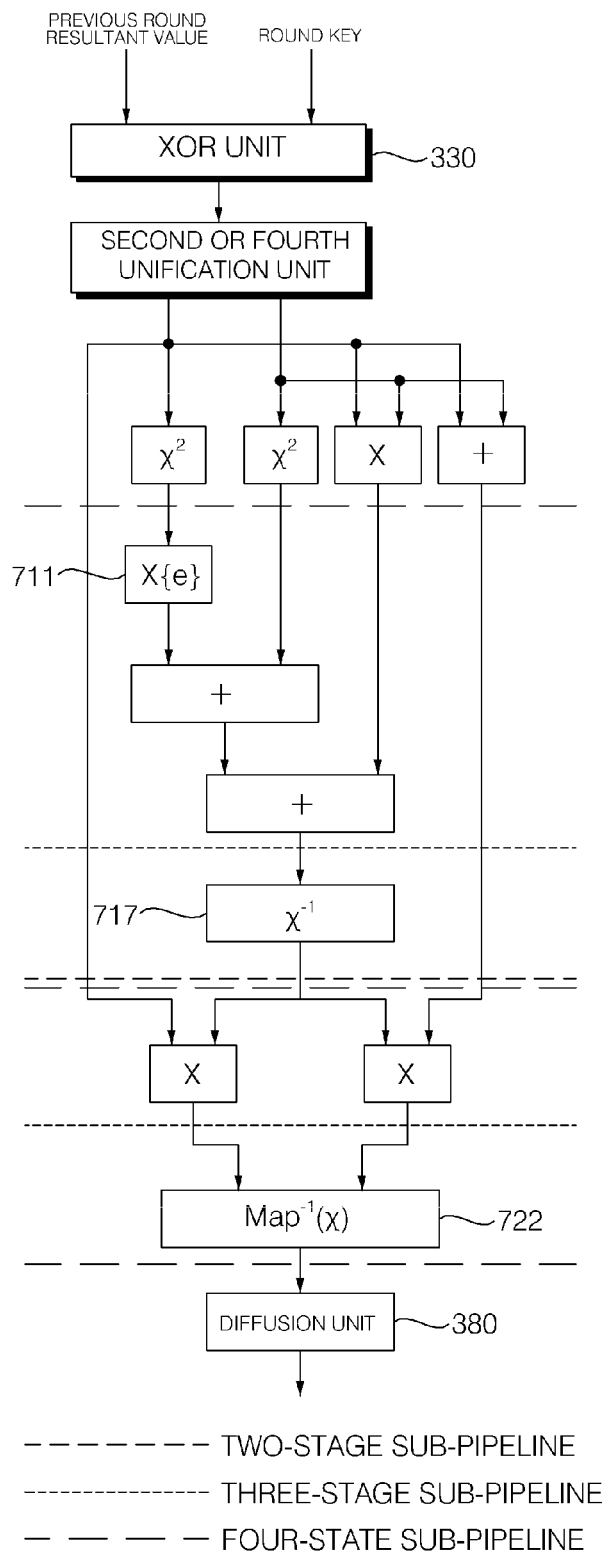
FIG. 15 is a block diagram illustrating that sub-pipelined registers are displayed on the round units that operate inverse substitution boxes $S_1^{-1}$ and $S_2^{-1}$ among the fourth to 11th round units of FIG. 1.

FIG. 15 is a block diagram illustrating that sub-pipelined registers are displayed on the round units that operate inverse substitution boxes S$_1$$^{-1}$ and S$_2$$^{-1}$ among the fourth to 11th round units of FIG. 1.

In the round units of the present embodiment, the positions of the sub-pipelined registers are divided into two stages, three stages, and four stages.

In the case of the two-stage sub-pipelined register, the sub-pipelined register is provided after the inverse unit 717 of GF($2^4$).

In the case of the three-stage sub-pipelined register, the first sub-pipelined register is provided before the inverse unit 717 of GF($2^4$) and the second sub-pipelined register is provided before the Map$^{-1}$(x) function unit 722.

In the case of the four-stage sub-pipelined register, the first sub-pipelined register is provided before the constant multiplier 711 that performs the multiplication operation for the constant {e} in GF($2^4$), the second sub-pipelined register is provided after the inverse unit 717 of GF($2^4$), and the third sub-pipelined register is provided before the diffusion unit 380.

In FIG. 15, the second unification unit or the fourth unification unit is displayed as the second unification unit when the Map(x) function unit and the first inverse affine conversion unit 146 are united and is displayed as the fourth unification unit when the Map(x) function unit and the second inverse affine conversion unit 156 are united.

Figure 16:
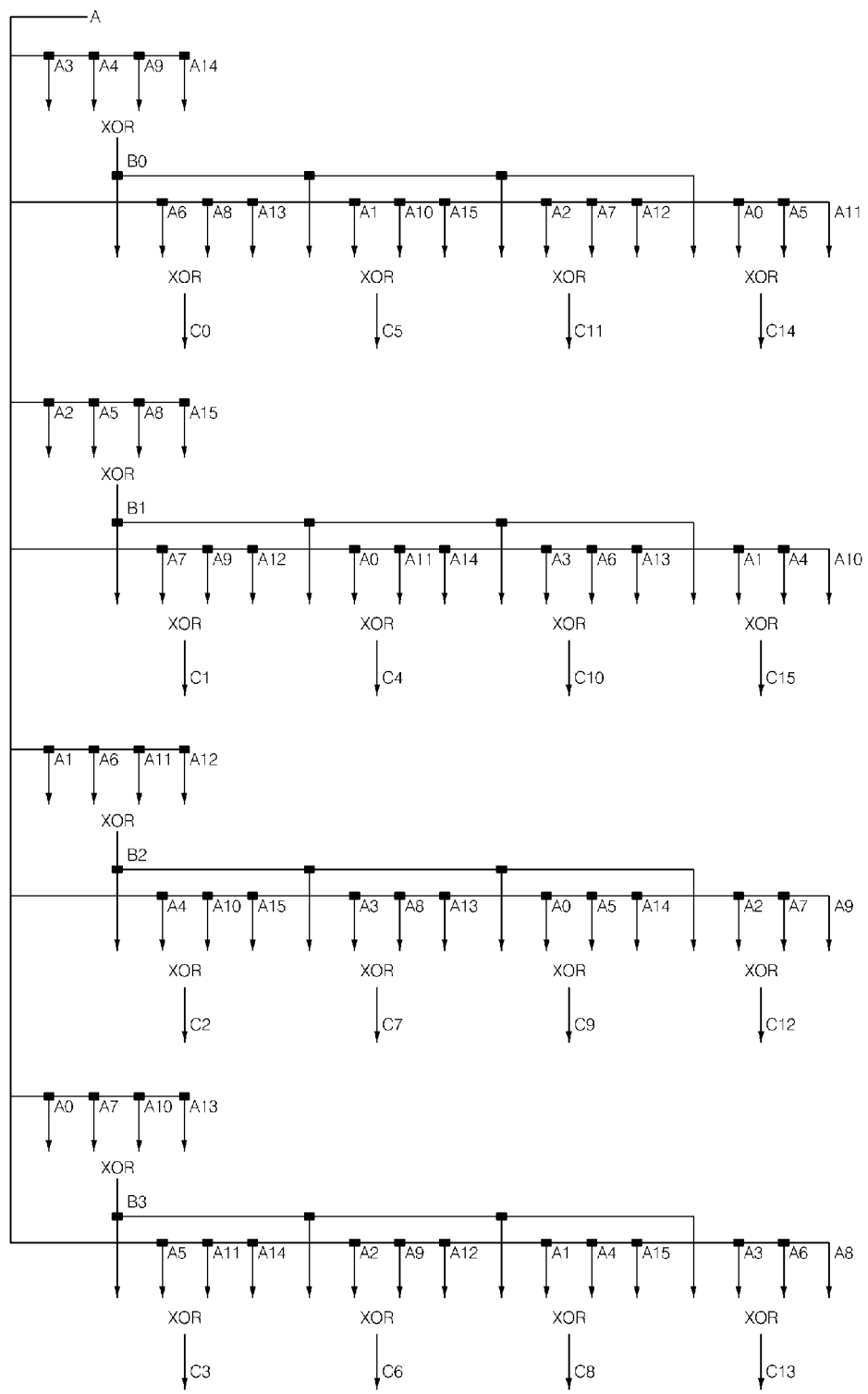
FIG. 16 is a block diagram illustrating an embodiment of the diffusion unit of FIGS. 2 to 4.

FIG. 16 is a block diagram illustrating an embodiment of the diffusion unit of FIGS. 2 to 4.

The diffusion units 180, 280, and 380 performs an operation on A of 16 bytes that is an input value to output C of 16 bytes that is an output value. Here, the input value A consists of A0 to A15 each of which means one byte. A0 means the uppermost byte and A15 means the lowermost byte. The output value C consists of C0 to C15 each of which means one byte. C0 means the uppermost byte and C15 means the lowermost byte. B0, B1, B2, and B3 mean the intermediate calculation values of one byte.

The diffusion operation processes of the diffusion units 180, 280, and 380 are represented in EQUATIONs 7A to 7D B0=A3 xor A4 xor A9 xor A14

C0=B0 xor A6 xor A8 xor A13

C5=B0 xor A1 xor A10 xor A15

C11=B0 xor A2 xor A7 xor A12

C14=B0 xor A0 xor A5 xor A11     [EQUATION 7A]

B1=A2 xor A5 xor A8 xor A15

C1=B1 xor A7 xor A9 xor A12

C4=B1 xor A0 xor A11 xor A14

C1=B1 xor A3 xor A6 xor A13

C15=B1 xor A1 xor A4 xor A10     [EQUATION 7B]

B2=A1 xor A6 xor A11 xor A12

C2=B2 xor A4 xor A10 xor A15

C7=B2 xor A3 xor A8 xor A13

C9=B2 xor A0 xor A5 xor A14

C12=B2 xor A2 xor A7 xor A9 [EQUATION 7C]

B3=A3 xor A4 xor A9 xor A14

C0=B0 xor A6 xor A8 xor A13

C5=B0 xor A1 xor A10 xor A15

C11=B0 xor A2 xor A7 xor A12

C14=B0 xor A1 xor A5 xor A11 [EQUATION 7D]

When the diffusion units 180, 280, and 380 are formed as described above, the diffusion units 180, 280, and 380 can be formed of 20 XOR units of 4 bytes. Therefore, it is possible to reduce the size of the hardware of the ARIA encryption apparatus in comparison with the case in which the diffusion units are formed of 16 XOR units of 7 bytes in a conventional art.

Although embodiments of the present invention have been described with reference to drawings, these are merely illustrative, and those skilled in the art will understand that various modifications and equivalent other embodiments of the present invention are possible. Consequently, the true technical protective scope of the present invention must be determined based on the technical spirit of the appended claims.

What is claimed is:

1. A high-speed pipelined ARIA encryption apparatus, comprising:
    a round key generator configured to generate a plurality of round keys required for performing an encryption operation in each of a plurality of round units by using a master key, the master key having a predetermined number of bits;
    the plurality of round units, each of which is configured to receive one or more corresponding round keys and an input value and to perform a round operation, a number of the round units being determined based on a number of bits of the input value; and
    a plurality of pipelined registers, each of which is disposed between two consecutive round units and configured to transmit an output value of a previous round unit to a next round unit,
    wherein first, second, and third round units among the plurality of round units are configured to perform a key initialization process to generate key initial values, and
    wherein the key initial values are used to generate the round keys,
    wherein the first round unit among the round units comprises:
        a first multiplexer configured to select and output one of a plaintext or a ciphertext and a first key generated by the master key;
        a second multiplexer configured to select one of a key initialization constant and a first round key generated by the round key generator;
        a first XOR unit configured to perform a bitwise XOR operation on values outputted from the first and second multiplexers;
        a substitution unit configured to perform a substitution operation on a value outputted from the first XOR unit;
        a diffusion unit configured to perform a diffusion operation on a value outputted from the substitution unit; and
        a second XOR unit configured to perform an XOR operation on a value outputted from the diffusion unit and a second key generated by the master key and to output a corresponding key initial value.

2. The high-speed pipelined ARIA encryption apparatus of claim 1, wherein the number of round units is 12, 14, and 16 when the input value has 128 bits, 192 bits, and 256 bits, respectively.

3. The high-speed pipelined ARIA encryption apparatus of claim 1, wherein each of the second and third round units among the round units comprises:
    a first multiplexer configured to select and output one of a key initialization constant and a round key corresponding to each of the round units;
    a first XOR unit configured to perform an XOR operation on a resultant value outputted from a previous round unit and a value outputted from the first multiplexer;
    a substitution unit configured to perform a substitution operation on a value outputted from the first XOR unit;
    a diffusion unit to perform a diffusion operation on a value outputted from the substitution unit and to output an output value; and
    a second XOR unit configured to perform an XOR operation on the output value outputted from the diffusion unit and one of a first key and a key initial value outputted from the previous round unit, and to output a corresponding key initial value.

4. The high-speed pipelined ARIA encryption apparatus of claim 1, wherein a final round unit among the round units comprises:
    a first XOR unit configured to perform an XOR operation on a resultant value from a previous round unit and a round key corresponding to the final round unit;
    a substitution unit configured to perform a substitution operation on a value outputted from the first XOR unit; and
    a second XOR unit configured to perform an XOR operation on a value outputted from the substitution unit and a last round key of the plurality of round keys generated by the round key generator and to output a final output value.

5. The high-speed pipelined ARIA encryption apparatus of claim 1, wherein a round unit disposed between the third round unit and a final round unit among the round units comprises:
    an XOR unit configured to preform an XOR operation on a resultant value from a previous round unit and a round key corresponding to the round unit;
    a substitution unit configured to perform a substitution operation on a value outputted from the XOR unit; and
    a diffusion unit configured to perform a diffusion operation on a value outputted from the substitution unit and to output an output value.

6. The high-speed pipelined ARIA encryption apparatus of claim 1,
    wherein each of the round units comprises a substitution unit configured to perform a substitution operation,
    wherein the substitution unit comprises:
        a first Sbox operation unit configured to perform substitution box $S_1$ and inverse substitution box $S_1^{-1}$ operations;

a second Sbox operation unit configured to perform substitution box $S_2$ and inverse substitution box $S_2^{-2}$ operations; and a controller configured to control the operations of the first Sbox operation unit and the second Sbox operation unit, wherein each of the first Sbox operation unit and the second Sbox operation unit comprises:

an inverse affine conversion unit configured to obtain an inverse substitution box of a corresponding input value;

a first multiplexer configured to select and output one of the corresponding input value and a resultant value of the inverse affine conversion unit;

a finite field inverse operation unit configured to calculate a $GF(2^8)$ inverse for the corresponding input value or the resultant value of the inverse affine conversion unit;

an affine conversion unit configured to obtain a substitution box of a resultant value of the finite field inverse operation unit; and a second multiplexer configured to select and output one of a resultant value of the affine conversion unit and the resultant value of the finite field inverse operation unit.

7. The high-speed pipelined ARIA encryption apparatus of claim 6, wherein the finite field inverse operation unit comprises:

a Map(x) function unit configured to process the corresponding input value using a $GF(2^4)$ isomorphic mapping function and to output first and second output values;

first and second squarers configured to perform a square operation in $GF(2^4)$ on the first and second output values of the Map(x) function unit, respectively;

a first multiplier configured to perform a multiplication operation in $GF(2^4)$ on the first and second output values of the Map(x) function unit;

a first adder configured to perform an addition operation in $GF(2^4)$ on the first and second output values of the Map(x) function unit;

a constant multiplier configured to receive an output value of the first squarer and to perform a multiplication operation on a constant $\{e\}$ in $GF(2^4)$;

a second adder configured to perform an XOR operation on an output value of the constant multiplier and an output value from the second squarer;

a third adder configured to perform an XOR operation on an output value of the second adder and an output value of the first multiplier;

an inverse unit configured to perform an inverse operation in $GF(2^4)$ on an output value from the third adder;

a second multiplier configured to perform a multiplication operation on the first output value of the Map(x) function unit and a resultant value from the inverse unit;

a third multiplier configured to perform a multiplication operation on a resultant value of the first adder and the resultant value from the inverse unit; and a $Map^{-1}(x)$ function unit configured to perform an operation by a $GF(2^4)^2$ isomorphic mapping function on resultant values of the second and third multipliers.

8. The high-speed pipelined ARIA encryption apparatus of claim 7, wherein the $Map^{-1}(x)$ function unit and the affine conversion unit of the first Sbox operation unit are united to form a first unification unit, wherein the Map(x) function unit and the inverse affine conversion unit of the first Sbox operation unit are united to form a second unification unit, wherein the $Map^{-1}(x)$ function unit and the affine conversion unit of the second Sbox operation unit are united to form a third unification unit, and wherein the Map(x) function unit and the inverse affine conversion unit of the second Sbox operation unit are united to form a fourth unification unit.

9. The high-speed pipelined ARIA encryption apparatus of claim 7, wherein sub-pipelined registers are provided in each of the round units in a form of a two-stage, three-stage, or four-stage structure, wherein, in the two-stage structure, a sub-pipelined register is provided after the inverse unit, wherein, in the three-stage structure, a first sub-pipelined register is provided before the inverse unit, and a second sub-pipelined register is provided after the second and third multipliers, and wherein, in the four-stage structure, a first sub-pipelined register is provided before the constant multiplier, a second sub-pipelined register is provided after the inverse unit, and a third sub-pipelined register is provided before a diffusion unit of said each of the round units.

10. The high-speed pipelined ARIA encryption apparatus of claim 7, wherein the Map(x) function unit is configured to process for the corresponding input value from the first multiplexer using the following matrix:

$$M = \begin{bmatrix} 1 & 0 & 0 & 0 & 1 & 1 & 1 & 0 \\ 0 & 1 & 1 & 0 & 0 & 0 & 0 & 0 \\ 0 & 1 & 0 & 0 & 0 & 0 & 0 & 1 \\ 0 & 0 & 1 & 0 & 1 & 0 & 0 & 0 \\ 0 & 0 & 0 & 0 & 1 & 1 & 1 & 0 \\ 0 & 1 & 0 & 0 & 1 & 0 & 1 & 1 \\ 0 & 0 & 1 & 1 & 0 & 1 & 0 & 1 \\ 0 & 0 & 0 & 0 & 0 & 1 & 0 & 1 \end{bmatrix}.$$

11. The high-speed pipelined ARIA encryption apparatus of claim 7, wherein the $Map^{-1}(x)$ function unit is configured to process the resultant values from the second and third multipliers using the following matrix:

$$M^{-1} = \begin{bmatrix} 1 & 0 & 0 & 0 & 1 & 0 & 0 & 0 \\ 0 & 0 & 0 & 0 & 1 & 1 & 0 & 1 \\ 0 & 1 & 0 & 0 & 1 & 1 & 0 & 1 \\ 0 & 1 & 0 & 0 & 1 & 1 & 1 & 0 \\ 0 & 1 & 0 & 1 & 1 & 1 & 0 & 1 \\ 0 & 0 & 1 & 0 & 1 & 1 & 0 & 0 \\ 0 & 1 & 1 & 1 & 1 & 0 & 0 & 1 \\ 0 & 0 & 1 & 0 & 1 & 1 & 0 & 1 \end{bmatrix}.$$

12. The high-speed pipelined ARIA encryption apparatus of claim 8, wherein the first unification unit is configured to process a corresponding input value using the following matrix:

$$\delta_1(\chi) = \begin{bmatrix} 1 & 0 & 1 & 0 & 1 & 1 & 0 & 1 \\ 1 & 1 & 1 & 1 & 1 & 1 & 0 & 1 \\ 1 & 0 & 0 & 1 & 1 & 1 & 0 & 0 \\ 1 & 0 & 1 & 0 & 1 & 0 & 1 & 1 \\ 1 & 1 & 0 & 1 & 1 & 0 & 1 & 1 \\ 0 & 1 & 1 & 1 & 1 & 1 & 1 & 1 \\ 0 & 0 & 0 & 0 & 1 & 0 & 1 & 1 \\ 0 & 1 & 1 & 0 & 1 & 0 & 1 & 1 \end{bmatrix} \begin{bmatrix} \chi_0 \\ \chi_1 \\ \chi_2 \\ \chi_3 \\ \chi_4 \\ \chi_5 \\ \chi_6 \\ \chi_7 \end{bmatrix} \oplus \begin{bmatrix} 1 \\ 1 \\ 0 \\ 0 \\ 0 \\ 1 \\ 1 \\ 0 \end{bmatrix}.$$

13. The high-speed pipelined ARIA encryption apparatus of claim 8, wherein the second unification unit is configured to process a corresponding input value using the following matrix:

$$\delta_1^{-1}(\chi) = \begin{bmatrix} 1 & 1 & 0 & 0 & 1 & 0 & 1 & 0 \\ 1 & 1 & 0 & 1 & 1 & 0 & 1 & 1 \\ 1 & 1 & 0 & 1 & 1 & 0 & 0 & 0 \\ 0 & 0 & 0 & 1 & 1 & 0 & 1 & 1 \\ 1 & 1 & 1 & 0 & 1 & 1 & 1 & 1 \\ 0 & 0 & 0 & 1 & 1 & 1 & 1 & 0 \\ 1 & 0 & 0 & 0 & 1 & 1 & 1 & 0 \\ 0 & 1 & 1 & 0 & 0 & 0 & 1 & 1 \end{bmatrix} \begin{bmatrix} \chi_0 \\ \chi_1 \\ \chi_2 \\ \chi_3 \\ \chi_4 \\ \chi_5 \\ \chi_6 \\ \chi_7 \end{bmatrix} \oplus \begin{bmatrix} 1 \\ 1 \\ 0 \\ 1 \\ 0 \\ 0 \\ 1 \\ 0 \end{bmatrix}.$$

14. The high-speed pipelined ARIA encryption apparatus of claim 8, wherein the third unification unit is configured to process a corresponding input value using the following matrix:

$$\delta_2(\chi) = \begin{bmatrix} 0 & 0 & 1 & 1 & 1 & 0 & 1 & 1 \\ 0 & 0 & 1 & 0 & 0 & 1 & 1 & 0 \\ 1 & 0 & 0 & 1 & 0 & 1 & 0 & 0 \\ 1 & 1 & 0 & 1 & 0 & 0 & 0 & 1 \\ 0 & 1 & 0 & 1 & 1 & 0 & 0 & 1 \\ 1 & 0 & 0 & 0 & 1 & 1 & 0 & 1 \\ 0 & 0 & 0 & 1 & 0 & 1 & 0 & 0 \\ 1 & 1 & 0 & 1 & 0 & 0 & 1 & 1 \end{bmatrix} \begin{bmatrix} \chi_0 \\ \chi_1 \\ \chi_2 \\ \chi_3 \\ \chi_4 \\ \chi_5 \\ \chi_6 \\ \chi_7 \end{bmatrix} \oplus \begin{bmatrix} 0 \\ 1 \\ 0 \\ 0 \\ 0 \\ 1 \\ 1 \\ 1 \end{bmatrix}.$$

15. The high-speed pipelined ARIA encryption apparatus of claim 8, wherein the fourth unification unit is configured to process a corresponding input value using the following matrix:

$$\delta_2^{-1}(\chi) = \begin{bmatrix} 0 & 0 & 1 & 0 & 0 & 0 & 1 & 0 \\ 0 & 0 & 1 & 0 & 1 & 1 & 0 & 0 \\ 1 & 0 & 1 & 1 & 0 & 1 & 0 & 1 \\ 1 & 1 & 1 & 0 & 0 & 1 & 1 & 0 \\ 0 & 0 & 1 & 1 & 1 & 0 & 1 & 0 \\ 1 & 1 & 1 & 0 & 0 & 1 & 0 & 0 \\ 0 & 0 & 0 & 1 & 0 & 0 & 0 & 1 \\ 1 & 1 & 1 & 1 & 1 & 0 & 0 & 0 \end{bmatrix} \begin{bmatrix} \chi_0 \\ \chi_1 \\ \chi_2 \\ \chi_3 \\ \chi_4 \\ \chi_5 \\ \chi_6 \\ \chi_7 \end{bmatrix} \oplus \begin{bmatrix} 1 \\ 1 \\ 0 \\ 1 \\ 1 \\ 0 \\ 1 \\ 1 \end{bmatrix}.$$

* * * * *